United States Patent [19]
Phelps

[11] Patent Number: 6,109,313
[45] Date of Patent: Aug. 29, 2000

[54] OIL RECYCLER

[76] Inventor: Brian C. Phelps, 102 Damian Ct., Jeannette, Pa. 15644

[21] Appl. No.: 09/288,130

[22] Filed: Apr. 8, 1999

[51] Int. Cl.[7] ....................................................... B65B 1/04
[52] U.S. Cl. ............................ 141/106; 141/364; 141/340
[58] Field of Search ............................... 141/98, 106, 364, 141/365, 366, 331, 340

[56] References Cited

U.S. PATENT DOCUMENTS

| | | | |
|---|---|---|---|
| 2,133,770 | 10/1938 | McGlohon | 141/106 |
| 4,848,596 | 7/1989 | Rudick | 141/364 |
| 5,269,354 | 12/1993 | Koberg | 141/106 |
| 5,540,264 | 7/1996 | Harp | 141/106 |
| 5,560,404 | 10/1996 | Blair et al. | 141/98 |

*Primary Examiner*—Steven O. Douglas

[57] ABSTRACT

A oil recycler for collecting used oil such as from the draining of oil from an engine so that the used oil may be dispensed into storage containers at measured volumes. The oil recycler includes a trough with a plurality of depressions downwardly extending from the bottom of the trough. Each depression has a bore therethrough. A support structure is included for supporting the trough above a resting surface.

20 Claims, 2 Drawing Sheets

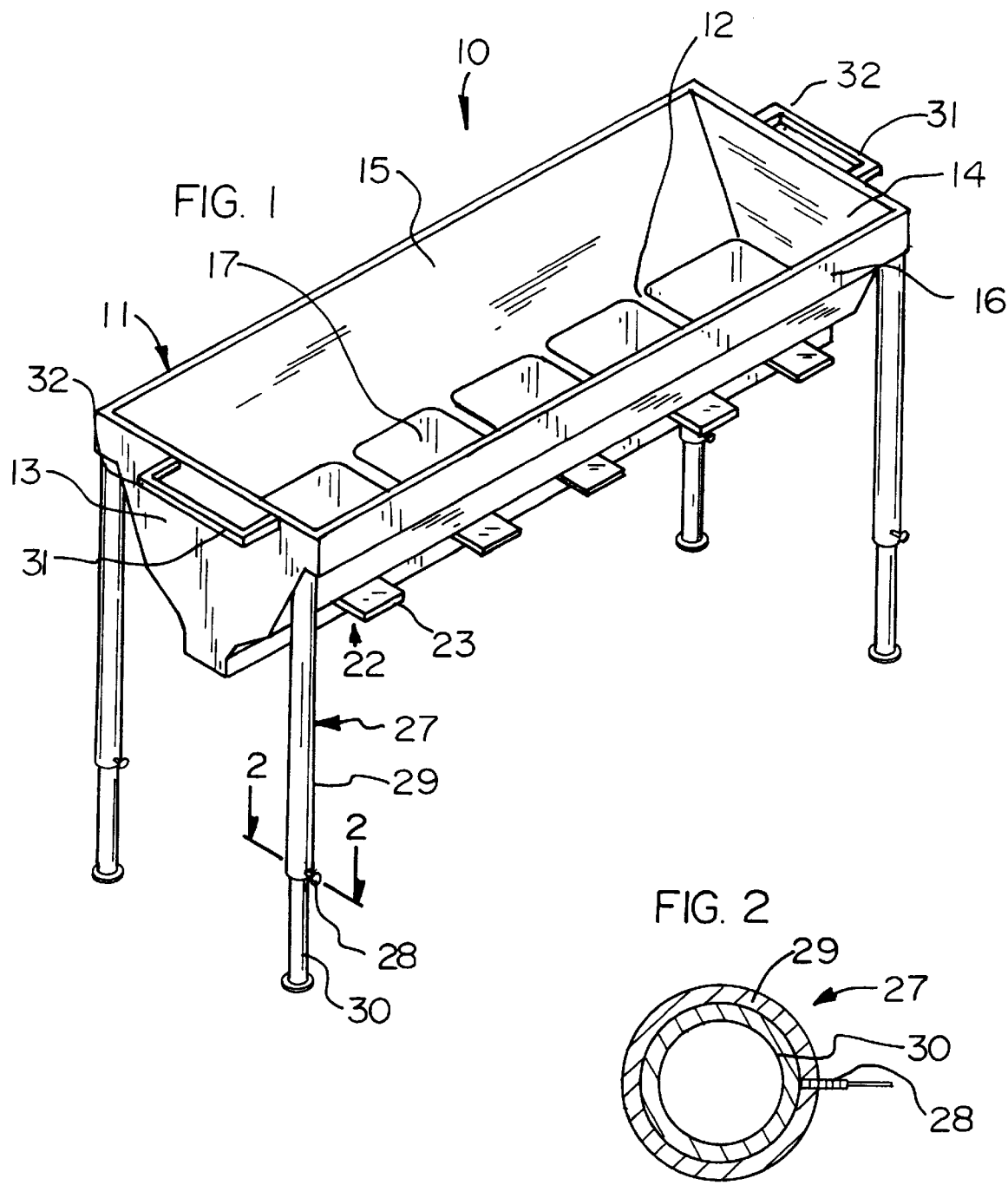

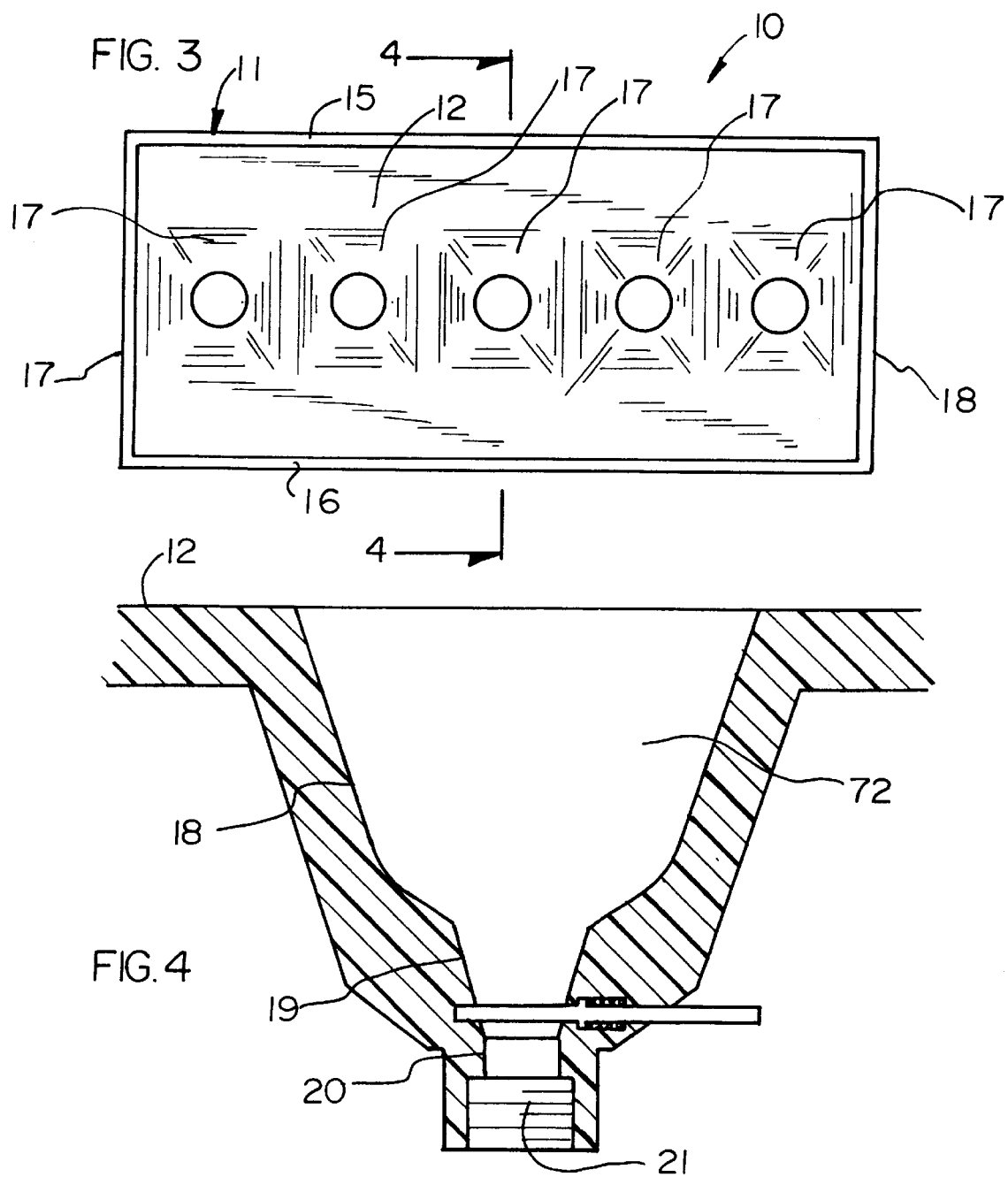

OIL RECYCLER

BACKGROUND OF THE INVENTION

1. Field of the Invention

The present invention relates to devices for collecting oil for recycling and more particularly pertains to a new oil recycler for collecting used oil such as from the draining of oil from an engine so that the used oil may be dispensed into storage containers at measured volumes.

2. Description of the Prior Art

The use of devices for collecting oil for recycling is known in the prior art. More specifically, devices for collecting oil for recycling heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,880,156 by Wallet; U.S. Pat. No. 5,067,530 by Short, III; U.S. Pat. No. 5,560,404 by Blair et al.; U.S. Pat. No. 3,169,605 by Ashmead; U.S. Pat. No. 5,168,959 by Davis; and U.S. Pat. No. Des. 299,178 by Smith which are all incorporated herein by reference.

While these devices fulfill their respective, particular objectives and requirements, the aforementioned patents do not disclose a new oil recycler. The inventive device includes a trough with a plurality of depressions downwardly extending from the bottom of the trough. Each depression has a bore therethrough. A support structure is included for supporting the trough above a resting surface.

In these respects, the oil recycler according to the present invention substantially departs from the conventional concepts and designs of the prior art, and in so doing provides an apparatus primarily developed for the purpose of collecting used oil such as from the draining of oil from an engine so that the used oil may be dispensed into storage containers at measured volumes.

SUMMARY OF THE INVENTION

In view of the foregoing disadvantages inherent in the known types of devices for collecting oil for recycling now present in the prior art, the present invention provides a new oil recycler construction wherein the same can be utilized for collecting used oil such as from the draining of oil from an engine so that the used oil may be dispensed into storage containers at measured volumes.

The general purpose of the present invention, which will be described subsequently in greater detail, is to provide a new oil recycler apparatus and method which has many of the advantages of the devices for collecting oil for recycling mentioned heretofore and many novel features that result in a new oil recycler which is not anticipated, rendered obvious, suggested, or even implied by any of the prior art devices for collecting oil for recycling, either alone or in any combination thereof.

To attain this, the present invention generally comprises a trough with a plurality of depressions downwardly extending from the bottom of the trough. Each depression has a bore therethrough. A support structure is included for supporting the trough above a resting surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil recycler apparatus and method which has many of the advantages of the devices for collecting oil for recycling mentioned heretofore and many novel features that result in a new oil recycler which is not anticipated, rendered obvious, suggested, or even implied by any of the prior art devices for collecting oil for recycling, either alone or in any combination thereof.

It is another object of the present invention to provide a new oil recycler which may be easily and efficiently manufactured and marketed.

It is a further object of the present invention to provide a new oil recycler which is of a durable and reliable construction.

An even further object of the present invention is to provide a new oil recycler which is susceptible of a low cost of manufacture with regard to both materials and labor, and which accordingly is then susceptible of low prices of sale to the consuming public, thereby making such oil recycler economically available to the buying public.

Still yet another object of the present invention is to provide a new oil recycler which provides in the apparatuses and methods of the prior art some of the advantages thereof, while simultaneously overcoming some of the disadvantages normally associated therewith.

Still another object of the present invention is to provide a new oil recycler for collecting used oil such as from the draining of oil from an engine so that the used oil may be dispensed into storage containers at measured volumes.

Yet another object of the present invention is to provide a new oil recycler which includes a trough with a plurality of depressions downwardly extending from the bottom of the trough. Each depression has a bore therethrough. A support structure is included for supporting the trough above a resting surface.

Still yet another object of the present invention is to provide a new oil recycler that lets a user collect used oil in measured amounts and pour those measured amounts into containers quickly and easily.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new oil recycler according to the present invention.

FIG. 2 is a schematic cross sectional view of an embodiment of a leg of the present invention taken from line 2—2 FIG. 1.

FIG. 3 is a schematic top view of the present invention.

FIG. 4 is a schematic cross sectional view of a depression of the present invention.

DESCRIPTION OF THE PREFERRED EMBODIMENT

With reference now to the drawings, and in particular to FIGS. 1 through 4 thereof, a new oil recycler embodying the principles and concepts of the present invention and generally designated by the reference numeral 10 will be described.

As best illustrated in FIGS. 1 through 4, the oil recycler 10 generally comprises a trough with a plurality of depressions downwardly extending from the bottom of the trough. Each depression has a bore therethrough. A support structure is included for supporting the trough above a resting surface.

In closer detail, the oil recycler 10 comprises a trough 11 having an open top, a bottom 12, a pair of ends 13,14, and a pair of sides 15,16 extending between the ends of the trough. In use, the trough is designed for positioning beneath an engine to collect therein oil drained from the engine. Preferably, the ends of the trough each are generally trapezoidal and taper in a downwards direction with the sides of the trough converging towards each other in a similar downwards direction. In an ideal illustrative embodiment, the trough has a length between the ends of the trough of between about 12 inches and about 18 inches, a width defined between the sides at the open top of between about 6 inches and about 12 inches, and a height defined between the open top and the bottom of the trough of between about 12 inches and about 18 inches.

The bottom of the trough has a plurality of downwardly extending depressions 17 therein. Preferably, the plurality of the depressions are arranged in a row extending between the ends of the trough. Each of the depressions has an inverted generally frusto-pyramidal-shaped upper portion 18, an inverted generally frusto-conical-shaped middle portion 19, a generally cylindrical lower portion 20, and terminates at a lower end. The upper portions of the depressions each define a reservoir for holding a predetermined volume of fluid therein. Ideally, the predetermined volume is about 32 ounces.

The lower end of each depression has a threaded bore 21 therethrough. In use, a plurality of containers are provided each having an open threaded neck which is threadably inserted into the threaded bore of an associated depression to fluidly connect each container to the associated depression so that oil collected in the trough may flow into the containers in measured volumes.

Each of the depressions has a trap door 22 substantially closing passage of fluid through the respective depression. The trap doors each are positioned between the upper and middle portions of the respective depression. Each of the trap doors is slidably extended through the trough in an outwards direction from one of the sides of the trough. The trap doors each has a handle portion 23 outwardly extending from the trough.

In use, each of the trap doors is slidable between open and closed positions. Each of the trap doors substantially closes passage through the associated depression when positioned in respective closed position. Each of the trap doors are slid outwards from the respective closed position to permit passage through the associated depression when positioned in the respective open position.

Each of the trap doors is biased towards the respective closed position. Preferably, each of the trap doors has a spring 24 biasing the respective trap door towards the respective closed position. The springs is disposed in the trough. Even more preferably, each of the trap doors has a stop extent 25 adjacent the associated spring of the respective trap door. Ideally, the trough has a plurality of chambers 26 therein. Each of trap doors is associated with one of the chambers. As illustrated in FIG. 4, the spring and stop extent of each trap door are disposed in the associated chamber.

A support structure is provided for supporting the trough above a resting surface such as a ground or floor surface. Preferably, the support structure comprises a plurality of legs 27 downwardly depending from the trough. Preferably, the legs are each adjustably and telescopically extendable to permit extension and retraction of leg to permit a user to adjust the height of the trough from the resting surface. In one embodiment, each of the legs has a threaded fastener 28 releasably holding telescopic portions 29,30 of the respective leg in a fixed position as illustrated in FIG. 2.

In a preferred embodiment, the ends of the trough each have an outwardly extending handle 31 with each handle having a push-button release actuator 32 thereon. In this preferred embodiment, the push-button release actuators is designed for permitting automatic extension of the legs generally simultaneously so that when the trough is lifted from beneath an engine a user may extend the legs while still holding the handles.

In use, the trough is positioned beneath an engine with the legs retracted if necessary. The engine is drained so that the drain oil collects in the depressions in the trough. The trough is then moved from beneath the engine and the legs are extended so that the trough may be raised above a resting surface on which the legs rest. The trap doors may then be opened to drain the collected oil in the containers attached to the depressions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oil recycler, comprising:
   a trough having an open top, a bottom, a pair of ends, and a pair of sides extending between said ends of said trough;
   said bottom of said trough having a plurality of downwardly extending depressions therein;
   each depression having a bore therethrough;
   a support structure for supporting said trough above a resting surface; and
   wherein each of said depressions has an inverted generally frusto-pyramidal-shaped upper portion, an inverted generally frusto-conical-shaped middle portion, a generally cylindrical lower portion, and terminating at a lower end, said bore of each depression being positioned adjacent said lower end of the respective depression.

2. The oil recycler of claim 1, wherein said ends of said trough each are generally trapezoidal and tapering in a downwards direction, and wherein said sides of said trough converge towards each other in a downwards direction.

3. The oil recycler of claim 1, wherein said plurality of said depressions are arranged in a row extending between said ends of said trough.

4. The oil recycler of claim 1, further comprising a plurality of containers each having an open neck, said neck of each container being inserted into the threaded bore of an associated depression to fluidly connect each container to the associated depression.

5. The oil recycler of claim 1, wherein each of said depressions having a trap door substantially closing passage of fluid through the respective depression.

6. The oil recycler of claim 5, wherein each of said trap doors is biases towards a closed position to prevent passage of fluid through the respective depression.

7. The oil recycler of claim 6, wherein each of said trap doors has a spring biasing the respective trap door towards the respective closed position.

8. The oil recycler of claim 7, wherein each of said trap doors has a stop extent adjacent the associated spring of the respective trap door.

9. The oil recycler of claim 8, wherein said trough has a plurality of chambers therein, each of trap doors being associated with one of said chambers, said spring and stop extent of each trap door being disposed in the associated chamber.

10. The oil recycler of claim 1, wherein said support structure comprises a plurality of legs downwardly depending from said trough.

11. The oil recycler of claim 10, wherein said legs are each telescopically extendable.

12. An oil recycler, comprising:
   a trough having an open top, a bottom, a pair of ends, and a pair of sides extending between said ends of said trough;
   said ends of said trough each being generally trapezoidal and tapering in a downwards direction, said sides of said trough converging towards each other in a downwards direction;
   said bottom of said trough having a plurality of downwardly extending depressions therein, wherein said plurality of said depressions are arranged in a row extending between said ends of said trough;
   each of said depressions having an inverted generally frusto-pyramidal-shaped upper portion, an inverted generally frusto-conical-shaped middle portion, a generally cylindrical lower portion, and terminating at a lower end;
   said upper portions of said depressions each defining a reservoir for holding a predetermined volume of fluid therein, wherein said predetermined volume is about 32 ounces;
   said lower end of each depression having a threaded bore therethrough;
   a plurality of containers each having an open threaded neck, said threaded neck of each container being threadably inserted into the threaded bore of an associated depression to fluidly connect each container to the associated depression;
   each of said depressions having a trap door substantially closing passage of fluid through the respective depression, said trap doors each being positioned between said upper and middle portions of the respective depression;
   each of said trap doors being slidably extended through said trough in an outwards direction from one of said sides of said trough, said trap doors each having a handle portion outwardly extending from said trough;
   each of said trap doors having open and closed positions, wherein each of said trap doors substantially closes passage through the associated depression when positioned in respective open position, wherein each of said trap doors are positioned to permit passage through the associated depression when positioned in the respective open position;
   each of said trap doors being biases towards the respective closed position, each of said trap doors having a spring biasing the respective trap door towards the respective closed position, said springs being disposed in said trough;
   each of said trap doors having a stop extent adjacent the associated spring of the respective trap door;
   said trough having a plurality of chambers therein, each of trap doors being associated with one of said chambers, said spring and stop extent of each trap door being disposed in the associated chamber;
   a support structure for supporting said trough above a resting surface, wherein said support structure comprises a plurality of legs downwardly depending from said trough;
   wherein said legs are each telescopically extendable; and
   said ends of said trough each having an outwardly extending handle.

13. An oil recycler, comprising:
   a trough having an open top, a bottom, a pair of ends, and a pair of sides extending between said ends of said trough;
   said bottom of said trough having a plurality of downwardly extending depressions therein;

each depression having a bore therethrough;

a support structure for supporting said trough above a resting surface; and a plurality of containers each having an open neck, said neck of each container being inserted into the threaded bore of an associated depression to fluidly connect each container to the associated depression.

14. The oil recycler of claim 13, wherein said ends of said trough each are generally trapezoidal and tapering in a downwards direction, and wherein said sides of said trough converge towards each other in a downwards direction.

15. The oil recycler of claim 13, wherein each of said depressions having a trap door substantially closing passage of fluid through the respective depression.

16. The oil recycler of claim 15, wherein each of said trap doors is biases towards a closed position to prevent passage of fluid through the respective depression.

17. The oil recycler of claim 16, wherein each of said trap doors has a spring biasing the respective trap door towards the respective closed position.

18. The oil recycler of claim 17, wherein each of said trap doors has a stop extent adjacent the associated spring of the respective trap door.

19. The oil recycler of claim 18, wherein said trough has a plurality of chambers therein, each of trap doors being associated with one of said chambers, said spring and stop extent of each trap door being disposed in the associated chamber.

20. The oil recycler of claim 13, wherein said support structure comprises a plurality of legs downwardly depending from said trough.

* * * * *